Aug. 4, 1959
M. LINTZ ET AL
2,898,466
DENSITY DETERMINING DEVICE
Filed March 15, 1954
3 Sheets-Sheet 1
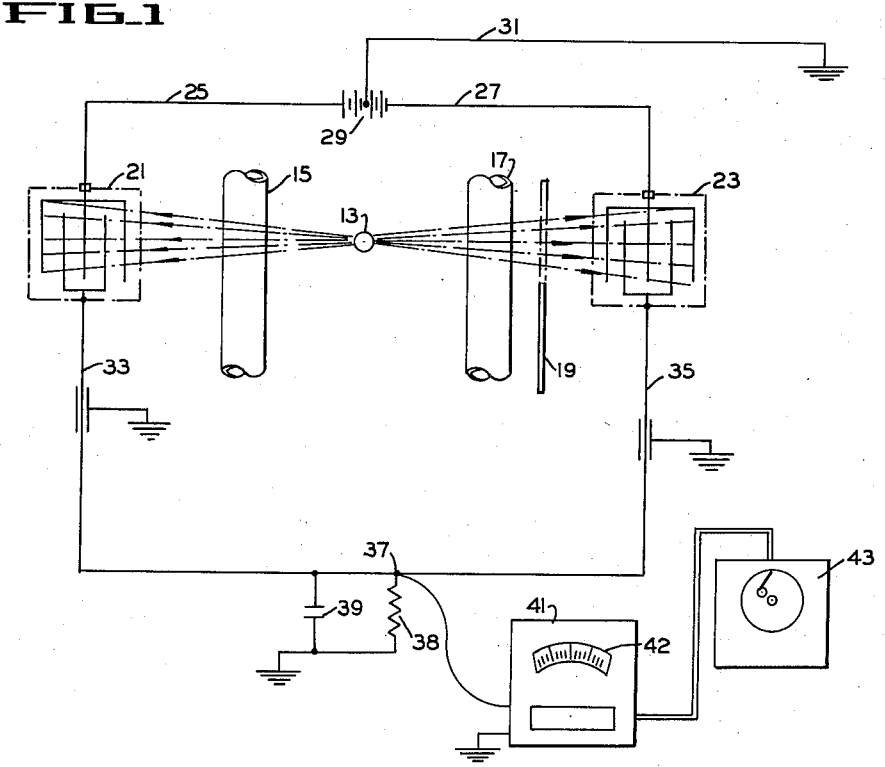
FIG_1
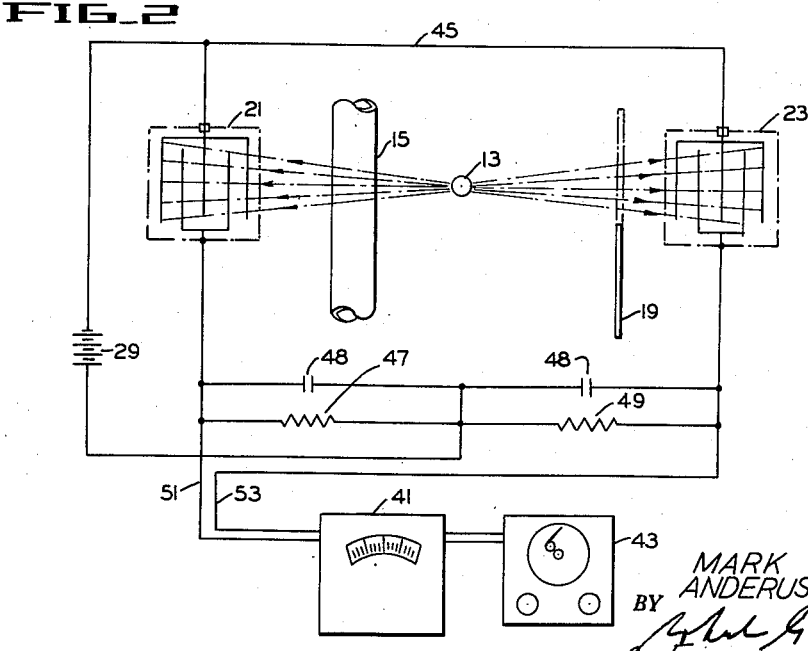
FIG_2
INVENTOR.
MARK LINTZ
ANDERUS J. ANDERSON
BY
ECKHOFF & SLICK
ATTORNEYS Aug. 4, 1959  M. LINTZ ET AL  2,898,466
DENSITY DETERMINING DEVICE
Filed March 15, 1954  3 Sheets-Sheet 2
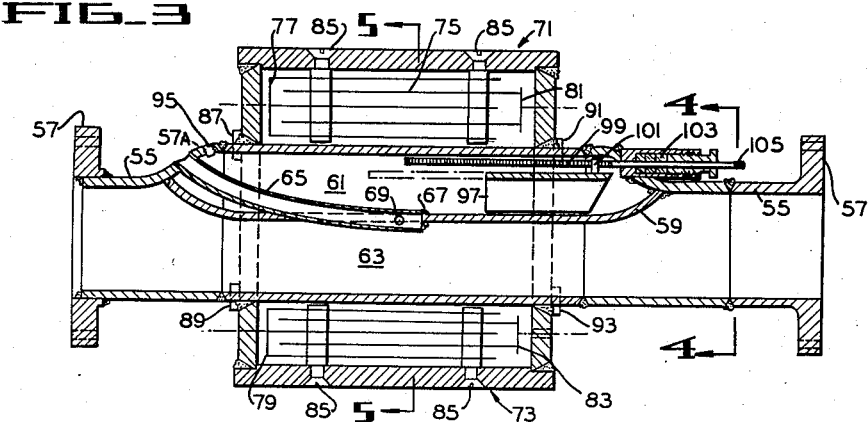
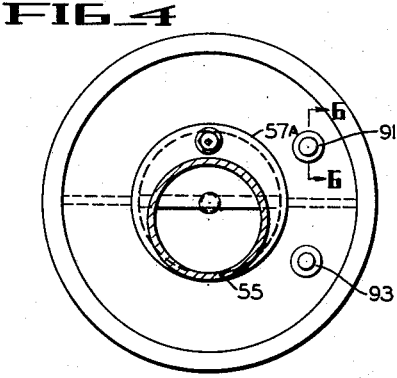 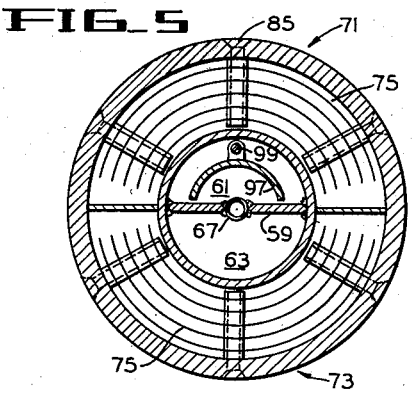
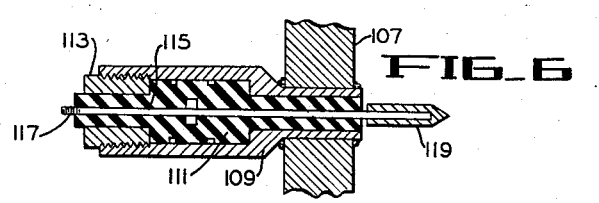
INVENTOR.
MARK LINTZ
ANDERUS J. ANDERSON
BY
ECKHOFF & SLICK
ATTORNEYS Aug. 4, 1959
M. LINTZ ET AL
2,898,466
DENSITY DETERMINING DEVICE
Filed March 15, 1954
3 Sheets-Sheet 3
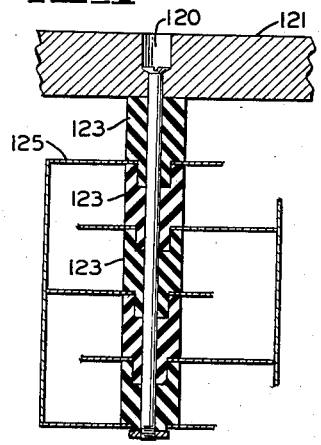
FIG_7
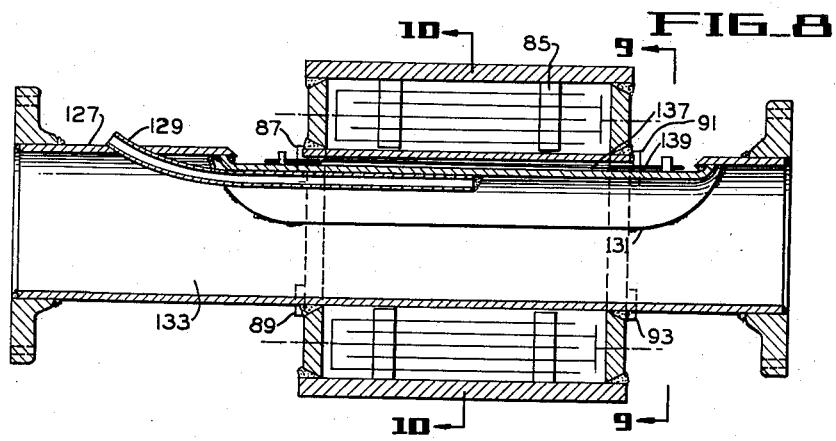
FIG_8
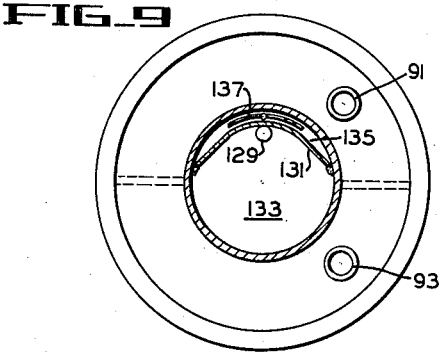
FIG_9
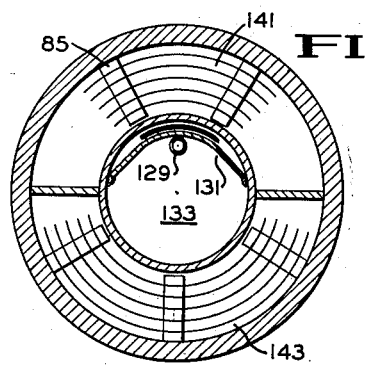
FIG_10
INVENTOR.
MARK LINTZ
ANDERUS J. ANDERSON
BY
ECKHOFF & SLICK
ATTORNEYS

United States Patent Office 2,898,466
Patented Aug. 4, 1959

2,898,466

DENSITY DETERMINING DEVICE

Mark Lintz, San Francisco, and Anderus J. Anderson, Palo Alto, Calif., assignors to Halliburton Oil Well Cementing Company, a corporation of Delaware Application March 15, 1954, Serial No. 416,102

8 Claims. (Cl. 250—43.5)

This invention relates to an apparatus for determining the density of liquids such as slurries, including slurries of cement, chemicals, and ores, and various other liquids such as oils and sewage. The instrument is based on the absorption of radiation, and particularly gamma radiation, by the liquid. In the past, it has been proposed to measure the density of liquids by placing a source of radiation, such as radium, on one side of a pipe carrying the liquid and measuring the amount of radiation which penetrates the liquid, there being a direct relationship between the density of the liquid and its ability to absorb radiation. However, such instruments are not entirely satisfactory for long continued use such as in process control work, since there is always some deterioration of the source of radiation and some shift in the characteristics of the equipment used to detect and amplify the radiation so that the instrument must be frequently recalibrated.

In accordance with the present invention, density detection and indication means are provided with which the indication of radiation penetrating a liquid is balanced against the indication of radiation penetrating some standard from the same source whereby deterioration of the radioactive source or change in the characteristics of the amplifying equipment has little, if any, effect on the net indication of penetration.

It is therefore one object of the present invention to provide a density measuring apparatus for liquids wherein change in characteristics of the electronic equipment or in the source of radiation has little effect on the accuracy or calibration of the instrument.

Another object of this invention is to provide a density measuring instrument having a movable shield whereby the instrument may be brought to balance over a wide range of densities.

Another object of this invention is to provide a density measuring instrument wherein the radiation absorption ability of a liquid is compared with a reproduceable standard liquid, such as a solution of a heavy metal salt.

Still another object of the present invention is to provide a density determining apparatus which is rugged in construction and which will operate for long periods of time without attention or recalibration.

Referring now to the drawings:

Figure 1 is a schematic diagram showing one embodiment of the present invention.

Figure 2 is a schematic diagram showing another embodiment of the invention.

Figure 3 is a view in cross-section showing one embodiment of the density measuring head of the present invention.

Figure 4 is a view, partially in section, on the lines 4—4 of Figure 3.

Figure 5 is a sectional view on the lines 5—5 of Figure 3.

Figure 6 is a sectional view on the lines 6—6 of Figure 4.

Figure 7 is a detailed view, in section, of one of the insulators shown in Figure 5.

Figure 8 is a cross-sectional view of another embodiment of the measuring head of the present invention.

Figure 9 is a view, partially in section, on the lines 9—9 of Figure 8.

Figure 10 is a sectional view on the lines 10—10 of Figure 8.

Referring now to Figure 1 by reference characters, there is shown a source of radiation 13, which may be any gamma emitting source such as radium or cobalt 60. It has been found in practice that 10 milligrams of radium constitute a suitable source. The radiation passes through two chambers, designated 15 and 17. Chamber 15 may contain a liquid of known density while chamber 17 contains a liquid, preferably a solution of radiation absorbing substance such as a solution of a heavy metal salt of known characteristics. In addition, a shield 19 may be provided, which can be moved in or out of the path of the radiation, as is indicated in dotted lines. Two radiation detectors are provided, designated 21 and 23, for detecting the radiation passing through chambers 15 and 17. Although tubes of the Geiger counter type could be utilized, it is preferred to provide detectors of the ionization chamber type which operate in the proportional region, to give more accurate indications. The detectors 21 and 23 are connected by means of wires 25 and 27 to a battery 29, which can be on the order of from 45 to 350 volts. A center tap connection 31 on the battery is grounded. The opposite terminals of detectors 21 and 23 are connected through the shielded wires 33 and 35 to a common connection point 37. The point 37 is grounded through a very high resistance 38, on the order of several hundred megohms, which may be by-passed by a small condenser 39 which can be on the order of .01 to .0001 mfd. The drop in voltage across the resistor 38 is amplified by the amplifier 41, which has an indicating scale 42, to indicate the voltage developed. If desired, a recorder 43 may be used to record the voltage developed. Suitable amplifiers and recorders are well-known to those skilled in the art and will not be described in detail.

In the embodiment shown in Figure 2, the operation is somewhat similar except that instead of being connected in series with the battery between the detectors 21 and 23, a common connection 45 is provided and the opposite terminals of said detectors are connected respectively to the resistors 47 and 49, which are by-passed by the condensers 48. These resistors and condensers are on the order of the values indicated above. The battery 29 is connected between the center point of the two resistors 47 and 49 and lead 45, while leads 51 and 53 are brought from said opposite connections of the detectors 21 and 23 to the amplifier 41 and recorder 43.

In the embodiment illustrated in Figure 2, it will be noted that the density of the liquid in line 15 is balanced against a shield member 19 only rather than the combination of a solution and a shield, as in Figure 1. However, it is apparent that either circuit may be used with either balancing arrangement.

In operation, both of the above units operate in a similar manner since, in each case, the current conducted by one detector is opposed by an equal current of opposite polarity conducted through the other detector, provided only that the absorption material between the source of radiation and the two detectors is the same. Thus, since the currents are equal and of opposite polarity, no voltage will be generated across resistor 38 to be fed into the amplifier 41. This is true even if there is a substantial deterioration of the source of radiation since the same source of radiation is fed into each of the detectors. If such radiation is increased or decreased, it merely means that the opposing currents are increased or decreased with no change in the resultant current. The circuit shown in Figure 1 is preferred since it has been found that it is more stable in operation, although either of the circuits may be used for carrying out the purposes of the present invention.

When it is desired to use the device of the present invention for process control, a liquid of known density can be balanced with a solution placed in the chamber 17 or by means of movable shield 19, or a combination of the two. After the instrument is once zeroed, the indicator will continue to read zero so long as the density of material passing through the chamber 15 remains constant. However, should the density vary even slightly from the assigned value, an immediate indication will be produced at 41 and 43. Thus, the operator can correct the density deviation and bring it back to the assigned value. Although the amplifier 41 is shown as operating a recorder 43, other devices may be operated such as automatic process control equipment. Thus, as is well-known to those skilled in the art, instead of utilizing a recorder 43 to show the change, flow control valve operating equipment can be used whereby the density of the stream will be brought automatically back into balance should it vary from the assigned value.

In Figures 3 through 7 is illustrated one embodiment of the detectors and flow head utilized in carrying out the present invention. In accordance with this embodiment, a pipe 55 is employed having flanges 57 on either end thereof, so that it can be bolted into a conventional pipeline. Preferably, pipe 55 has an enlarged portion 57A, as is shown, so that the measuring equipment can be accommodated within the pipe without substantially reducing the carrying flow capacity of the pipe below that of the line in which it is designed to be incorporated. As shown, the pipe is divided into two substantially equal sections by means of the separator 59. This divides the pipe into an upper chamber, 61, and a lower chamber, 63. A tube 65 leads from the outside of the pipe, terminating in a section 67, which lies in the exact center of the chambers 61 and 63. A source of radiation 69, such as radium, is placed in the tube so that it is equidistant from the walls of the tube, and the enlarged portion of the pipe 57A. If desired, a plastic rod, or other suitable handle, can be attached to the radium 69. Means can also be provided for plugging a hole in the tube 65 to protect workers from any radiation hazard. Surrounding the section 67 are two detectors of the ionization chamber type, designated in general 71 and 73. Each of such chambers contains a number of concentric semi-circular plates of metal 75. The chambers themselves are filled with a suitable gas which could be air, but which is preferably argon or nitrogen under a pressure of about 500 pounds per square inch. However, other gases and pressures can be utilized, as is well-known to those skilled in the art. In the embodiment illustrated, each of chambers 71 and 73 contains one set, designated 77 and 79, of three plates, and one set, designated 81 and 83, of two plates. As is well-known, the insulation between the various plates of the chamber is highly important since a very high resistance must be maintained. For this purpose, a number of insulators 85 are provided to hold the plates in spaced relationship and said insulators are hereinafter described in greater detail. It is also important that the electrodes leaving the chamber be well insulated. Said electrodes are four in number, two being provided for each chamber, so that electrode 87 is connected with plates 77, electrode 89 with plates 79, electrode 91 with plate 81, and electrode 93 with plate 83.

In order that a suitable solution may be placed in chamber 61, a filler plug 95 is provided.

A movable shield 97 is provided in the chamber 61 to regulate the amount of radiation which reaches the chamber 71. By the use of the movable shield 97, one does not have to employ a solution in the chamber 61 which exactly matches the desired density flowing through the chamber 63, but adjustments can be made, giving a finer degree of density regulation. The movable shield is adapted to move along the micrometer rod 99, and is attached to the micrometer rod by the threaded lug 101. A packing gland 103 is provided for the micrometer rod to give a liquid tight seal. When it is desired to adjust the shield 97, one need only turn the knurled end 105 of the micrometer screw 99.

As has been mentioned heretofore, it is important that the plates of the ionization chamber be well insulated from one another, as well as from the walls of the chamber. Therefore, insulators are provided, both for the external connection and for holding the plates in position. In Figure 6 is illustrated in detail one of the external connectors. In this construction, the wall of the chamber 107 is provided with a hole into which is inserted a metal bushing 109. The interior of the bushing 109 is filled with a good insulator, such as a plastic 111, and the insulator is held in place by the threaded member 113. Through the center of the insulator, the conducting rod 115 is inserted and the rod 115 is provided on its internal end with a screw connection 117, for attachment to the plate of the counter, and is provided on its external end with a plug 119 of conventional design. In Figure 7, an insulator is illustrated for holding the plates in proper alignment. This insulator consists of a rod 120, which is inserted through the wall 121 of the chamber and on which a number of pieces of plastic insulation material, 123, are placed. It will be noted that each of the plastic inserts nests with its neighbor, producing a firm structure for holding the plates 125.

In Figures 8, 9, and 10, another embodiment of the invention is illustrated wherein a movable shield 137 is provided as the sole source for varying the amount of radiation which reaches the ionization chamber 141, which is used for comparison purposes. In this embodiment of the invention, a pipe 127 carries the liquid. Tube 129 is provided as before for insertion and removal of the radioactive material. A partition 131 is provided in the pipe, which divides the pipe into two chambers, one a large chamber 133, which serves to convey fluid through the pipe, and the other a small chamber, 135, which need only be large enough to accommodate movable shield 137. The shield 137 is mounted on an adjusting rod 139, and the shield can be moved back and forth to shield out more or less of the radiation, as desired. In this particular embodiment, it will be noted that the upper ionization chamber 141 is made smaller than the lower chamber 143. This is for the reason that one is not comparing the density of one liquid or solution against another, but merely against an arbitrary standard, i.e., the shield.

It has been found that apparatus of the present invention give very accurate indications of density when the material being passed through is of fairly constant composition. For instance, a cement slurry ordinarily has a fairly constant composition of calcium carbonate, silica, alumina, iron and the like, and the apparatus will therefore give an accurate indication of the percentage of cement in the slurry. On the other hand, it is frequently desirable to be able to detect changes in composition such as in a metallurgical process. Thus, the amount of material passing through the chamber may be constant, but if the percentage composition of various components within a slurry varies, there will immediately be an indication of the change.

In the embodiment illustrated in Figure 3, a reference solution is used in preference to a slurry. This is for the reason that the slurry would tend to settle out and might give a false reading. For this purpose, solutions of varying concentrations of heavy metal salts, such as barium chloride, are quite suitable since such salts have high shielding properties and reasonably high solubility.

When the movable shields are used, it is preferable that the edges of the shields be serrated or notched, since this provides more accurate setting of the shield.

One particularly valuable feature of the present invention is the fact that a good heat exchange relationship exists between the liquid passing through the chamber and the reference solution. Thus, if the liquid being measured changes in temperature, it will almost immediately cause a like change in the temperature of the reference solution, which will cancel out any error which might be introduced through the variation in temperature.

In initially adjusting the instrument, a material of known shielding effect is selected which will have the same shielding effect as the material to be measured. For instance, if one desires to measure a cement slurry having a specific gravity of 1.5, one selects a solution having an equal shielding effect and places this solution in the reference chamber 61. The desired slurry is then passed through the chamber 63. Once a proper reference material has been selected, the apparatus will be in balance, giving a null indication through the amplifier 41. On the other hand, if there is some minor variation, it can be compensated for by adjustment of the shield 97.

One of the major advantages of the present invention is that it can be used in determining the densities of fluids which are little more or less dense than water, and that extremely minute changes in density can be measured. For instance, the device has been applied to determining the density of sewage where the density differs very little from that of water. In such applications, the accurate determination of density enables the processing steps to be carried on more efficiently. When determining the density of such substances, a reference fluid such as water or oil can be used alternately, the movable shield or a combination of the shield and such a fluid can be used.

In the same manner, the device shown in Figure 8 is adjusted by moving the shield to a position such that it balances a slurry of the desired concentration. Then, if there is a variation in the shielding properties of the slurry, an indication will be produced through the amplifier and indicator 41.

It will be apparent to those skilled in the art that many variations are possible without departing from the scope of the present invention. For instance, the size and shape of the chambers may be changed in various manner. Rather than providing a single pipe with a division in it, a separate chamber could be provided for the referenced material, with the radio-active material positioned between the pipe and chamber.

We claim:

1. A density determining apparatus comprising a pipe, a partition dividing the pipe into two transverse sections, one a large section for carrying a fluid and a small section, a source of radiation mounted in said partition, a movable shield in said small section, and two radiation detecting devices adjacent the pipe, one of said devices being adjacent each section.

2. An apparatus suitable for continuous fluid density determination, comprising, a pressurable conduit adapted for connection into a process flow system, a source of penetrative radiation mounted adjacent to the periphery of said conduit, a first electrically actuated radiation detection device mounted adjacent to said conduit and opposite said source in such position as to receive only that radiation from said source which has passed through said conduit, said first detection device adapted to produce an electrical signal proportional to said detected radiation, a second electrically actuated radiation detection device mounted adjacent to the periphery of said conduit and adjacent to said radiation source, a radiation absorbing shield of selectively variable radiation absorbing value corresponding to the desired density of a fluid in said conduit mounted intermediate said radiation source and said second radiation detection device, said second radiation detection device adapted to detect only that radiation passing through said radiation absorbing shield, said second radiation detection device adapted to produce an electrical signal proportional to detected radiation, the electrical signal of said first detection device adapted to countervail the electrical signal of said second radiation detection device whereby the net signal produced by said first and second radiation detection devices will be responsive only to density variation of fluids passing through said conduit.

3. An article of manufacture suitable for continuous fluid density determination, comprising, a pressurable conduit adapted for continuous fluid passage therethrough, a source of penetrative radiation mounted adjacent to the periphery of said conduit, a first electrically actuated radiation detection device mounted adjacent to said conduit in such position as to detect only that radiation from said source which has passed through said conduit, said first detection device adapted to produce an indication proportional to said detected radiation, a second electrically actuated radiation detection device mounted adjacent to the periphery of said conduit and adjacent to said radiation source, a radiation absorbing shield mounted intermediate said radiation source and said second radiation detection device adapted to have a radiation absorption value selectively varied in response to a desired density of fluid in said conduit, said second radiation detection device adapted to detect only that radiation passing through said radiation absorbing shield, said second radiation detection device adapted to produce an indication proportional to detected radiation, the difference in indication of said detection devices being proportional to the density variation in the fluid passing through said conduit.

4. Apparatus suitable for continuous measurement of density, comprising, a conduit adapted to contain fluid passing therethrough, a source of gamma radiation mounted with said conduit, a first radiation detection device mounted adjacent to and conforming to the periphery of said conduit and opposite to said radiation source adapted to produce an indication responsive only to radiation detected through said conduit, a second radiation detection device mounted adjacent to and conforming to the periphery of said conduit and adjacent to said radiation source adapted to produce an indication responsive only to radiation detected through a selectively variable radiation absorbing shield mounted intermediate said radiation source and said second radiation detecting device, the absorption value of said shield adapted to be selected to correspond to an absorption value of a particular fluid density, and electrical indicating means adapted to indicate the net difference in indication of said detection devices, said difference being responsive only to density variation of a fluid passing through said conduit.

5. An article of manufacture suitable for continuous fluid density determination, comprising a pressurable conduit adapted for connection into a process flow system, a source of penetrative radiation mounted adjacent to the periphery of said conduit, a first electrically actuated radiation detection device mounted adjacent to said conduit and opposite said source in such position as to receive only that radiation from said source which has passed through said conduit, said first detection device adapted to produce an electrical signal proportional to said detected radiation, a second electrically actuated radiation detection device mounted adjacent to the periphery of said conduit and adjacent to said radiation source, a movable radiation absorbing shield member mounted intermediate said radiation source and said second radiation detection device, said second radiation detection device adapted to detect only that radiation passing through said radiation absorbing shield, said second radiation detection device adapted to produce an electrical signal proportional to detected radiation, the electrical signal of said first detection device adapted to countervail the electrical signal of said second radiation detection device whereby the net signal produced by said first and second radiation detection devices will be responsive only to density variation of a fluid passing through said conduit.

6. An article of manufacture suitable for continuous fluid density determination, comprising, a pressurable conduit adapted for continuous fluid passage therethrough, a source of penetrative radiation mounted adjacent to the periphery of said conduit, a first electrically actuated radiation detection device mounted adjacent to said conduit in such position as to detect only that radiation from said source which has passed through said conduit, said first detection device adapted to produce an indication proportional to said detected radiation, a second electrically actuated radiation detection device mounted adjacent to the periphery of said conduit and adjacent to said radiation source, a movable radiation absorbing shield member mounted intermediate said radiation source and said second detection device adapted to have a radiation absorption value selectively varied in response to the radiation absorption quality of a desired density of a fluid in said conduit, said second radiation detecting device adapted to detect only that radiation passing through said radiation absorbing shield member, said second radiation detecting device adapted to produce an indication proportional to detected radiation, the difference in indication of said detection devices being proportional to the density variation in the fluid passing through said conduit.

7. An article of manufacture suitable for continuous fluid density determination, comprising, a pressurable conduit adapted for connection into a process flow system, a source of penetrative radiation mounted adjacent to the periphery of said conduit, a first electrically actuated radiation detection device mounted adjacent to said conduit and opposite said source in such position as to receive only that radiation from said source which has passed through said conduit, said first detection device adapted to produce an electrical signal proportional to said detected radiation, a second electrically actuated radiation detection device mounted adjacent to the periphery of said conduit and adjacent to said radiation source, a radiation absorbing chamber containing a liquid selectively variable in radiation absorbing value mounted intermediate said radiation source and said second radiation detection device, said second radiation detection device adapted to detect only that radiation passing through said radiation absorbing chamber, said second radiation detection device adapted to produce an electrical signal proportional to detected radiation, the electrical signal of said first detection device adapted to countervail the electrical signal of said second radiation detection device whereby the net signal produced by said first and second radiation detection devices will be responsive only to density variation of the fluid passing through said conduit.

8. An article of manufacture suitable for continuous fluid density determination, comprising, a pressurable conduit adapted for continuous fluid passage therethrough, a source of penetrative radiation mounted adjacent to the periphery of said conduit, a first electrically actuated radiation detection device mounted adjacent to said conduit in such position as to detect only that radiation from said source which has passed through said conduit, said first detection device adapted to produce an indication proportional to said detected radiation, a second electrically actuated radiation detection device mounted adjacent to the periphery of said conduit and adjacent to said radiation source, a radiation absorbing chamber containing a liquid selectively variable in radiation absorbing value mounted intermediate said radiation source and said second radiation detection device adapted to have a radiation absorption value selectively varied in response to the radiation absorption quality of a desired density of a fluid in said conduit, said second radiation detecting device adapted to detect only that radiation passing through said radiation absorbing chamber, said second radiation detecting device adapted to produce an indication proportional to detected radiation, the difference in indication of said detection devices being proportional to the density variation in the fluid passing through said conduit.

References Cited in the file of this patent

UNITED STATES PATENTS

| | | |
|---|---|---|
| 2,367,949 | Langer | Jan. 23, 1945 |
| 2,475,137 | Herzog | July 5, 1949 |
| 2,641,710 | Pompeo et al. | June 9, 1953 |
| 2,735,944 | Greer | Feb. 21, 1956 |
| 2,757,290 | Jacobs et al. | July 31, 1956 |